United States Patent
Appelberg

(10) Patent No.: US 9,088,212 B2
(45) Date of Patent: Jul. 21, 2015

(54) SYNCHRONOUS NON-ISOLATED PUSH-PULL CONVERTER

(75) Inventor: Mikael Appelberg, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 486 days.

(21) Appl. No.: 13/340,013

(22) Filed: Dec. 29, 2011

(65) Prior Publication Data

US 2013/0070503 A1    Mar. 21, 2013

Related U.S. Application Data

(60) Provisional application No. 61/535,379, filed on Sep. 16, 2011.

(51) Int. Cl.
*H02M 3/158* (2006.01)
*H02M 3/337* (2006.01)

(52) U.S. Cl.
CPC .......... *H02M 3/1584* (2013.01); *H02M 3/1588* (2013.01); *H02M 3/337* (2013.01); *H02M 3/3378* (2013.01)

(58) Field of Classification Search
CPC . H02M 3/158; H02M 3/1584; H02M 3/1588; H02M 3/337; H02M 3/3372; H02M 3/3376; H02M 3/3378
USPC ....................................... 363/16, 22–26, 133
See application file for complete search history.

(56) References Cited

U.S. PATENT DOCUMENTS

| | | | | |
|---|---|---|---|---|
| 3,925,715 A * | 12/1975 | Venable | ........................... | 363/26 |
| 4,186,437 A * | 1/1980 | Cuk | ............................... | 363/65 |
| 5,598,325 A * | 1/1997 | Pleitz | .............................. | 363/24 |
| 6,246,592 B1 * | 6/2001 | Balogh et al. | ................... | 363/16 |
| 6,429,629 B1 * | 8/2002 | Nguyen | ........................ | 323/255 |
| 7,352,596 B2 * | 4/2008 | Cheng | ............................. | 363/24 |

(Continued)

FOREIGN PATENT DOCUMENTS

EP    2081287 A1    7/2009

OTHER PUBLICATIONS

Synchronous Rectification in High-Performance Power Converter Design. Texas Instruments, Literature No. SNVA595. Published on Mar. 21, 2007. Obtained from http://www.ti.com/lit/an/snva595/snva595.pdf on Aug. 13, 2014.*

(Continued)

*Primary Examiner* — Fred E Finch, III
(74) *Attorney, Agent, or Firm* — Rothwell, Figg, Ernst & Manbeck, P.C.

(57) ABSTRACT

A push-pull converter configured to convert an input voltage to an output voltage according to a transfer ratio is provided. The push-pull converter comprises a transformer, a first and a second switch transistor arranged to operatively provide the input voltage to the transformer such that the transfer ratio is obtainable, a first and a second rectification transistor arranged to operatively receive a first and a second part, respectively, of the output voltage from the transformer such that the transfer ratio is obtainable. The push-pull converter is further configured to synchronously operate the first switch transistor and the first rectification transistor, synchronously operate the second switch transistor and the second rectification transistor, and operate the first and second switch transistors 180 degrees out of phase with respect to each other.

15 Claims, 6 Drawing Sheets

(56) References Cited

U.S. PATENT DOCUMENTS

2003/0026112 A1* 2/2003 Winick et al. ............... 363/24
2005/0030768 A1* 2/2005 MacMillan ................. 363/25
2009/0290385 A1* 11/2009 Jungreis et al. ............ 363/17

OTHER PUBLICATIONS

International Search Report and Written Opinion dated Dec. 11, 2012 for PCT/EP2011/074086, 10 pages.

* cited by examiner

SYNCHRONOUS NON-ISOLATED PUSH-PULL CONVERTER

This application claims the benefit of U.S. Provisional Patent Application No. 61/535,379, filed on Sep. 16, 2011, the entire contents of which is hereby incorporated by reference.

TECHNICAL FIELD

Embodiments herein relate to a push-pull converter configured to convert an input voltage to an output voltage according to a transfer ratio.

BACKGROUND

For many years the trend in the field has been to use a non isolated push-pull converter with diode rectification and a transfer ratio of one to create the bias voltage for RF transmitting transistors. The converter can also operate as a boost converter by placing a load between nodes for output and input voltage. This allows for a high efficiency boost conversion using small magnetic components.

Lately the power requirement from said converter, i.e. the above mentioned converter comprising diode rectification and having a transfer ratio of one, has increased. Moreover, transfer ratios greater than one are often required. At the same time, board area available for the converter has been reduced. This force an extreme efficiency incensement compared to the known solution.

In FIG. 1, a known converter is shown. The converter converts an input voltage Vin to an output voltage Vout. The converter uses diode rectification, by means of diodes D_A, D_B, for providing parts of the output voltage averaged via the inductor L1 and capacitor C1.

SUMMARY

The known solution, illustrated in FIG. 1, uses diode rectification and is limited to the transfer ratio of one. To get around this a full-bridge concept is often used, incorporating a transistor full-bridge on each side of the transformer. This implementation offers excellent performance but requires double the amount of rectifying elements as the non-isolated push-pull. An example of such a full-bridge implementation is shown in FIG. 2. Four transistors, Ts_A, Ts_B, constitute the full-bridge at a primary side of the transformer TX. These transistors switch the input voltage over the primary side of the transformer TX. An additional four transistors Tr_A, Tr_B, constitute the full-bridge at a secondary side of the transformer TX. These transistors provide the rectified output voltages, which are averaged over an inductor L1 and a capacitor C1 similarly to as in FIG. 1. A disadvantage with the converter according to FIG. 2 is that it requires a lot of board space, or board area.

Therefore, an object may be to provide a push-pull converter with reduced power consumption while at the same time the board area is kept low.

According to an aspect, the object is achieved by a push-pull converter configured to convert an input voltage to an output voltage according to a transfer ratio. In some embodiments, the push-pull converter comprises a transformer comprising a first set of transformer windings and a second set of transformer windings. The first and second sets of transformer windings are arranged with opposite polarity with respect to each other. The push-pull converter further comprises a first switch transistor arranged to operatively provide the input voltage to the first set of transformer windings such that the transfer ratio is obtainable. The push-pull converter further comprises a second switch transistor arranged to operatively provide the input voltage to the second set of transformer windings such that the transfer ratio is obtainable. The push-pull converter further comprises a first rectification transistor arranged to operatively receive a first part of the output voltage from the first set of transformer windings such that the transfer ratio is obtainable. The push-pull converter further comprises a second rectification transistor arranged to operatively receive a second part of the output voltage from the second set of transformer windings such that the transfer ratio is obtainable. Moreover, the push-pull converter is configured to synchronously operate the first switch transistor and the first rectification transistor, synchronously operate the second switch transistor and the second rectification transistor, and operate the first and second switch transistors 180 degrees out of phase with respect to each other.

Thanks to low loss of power in the rectifying transistors as compared to loss in a diode, performance in terms of power consumption is improved. That is to say, the power consumption of the push-pull converter is reduced.

Moreover, thanks to synchronous operation of the first switch transistor and the first rectification transistor as well as the second switch transistor and the second rectification transistor, a reduction of the so called dead time may be reduced. The reduction of the dead time allows for reduced power dissipation in e.g. high frequency applications.

A further advantage is that the transfer ratio may be adjusted to different values, being less than, equal to or greater than one, while the power consumption of the converter still is reduced as explained above.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

As previously mentioned, embodiments herein disclose a modified non isolated push pull converter which can be implemented in various different ways giving different transfer ratios, whist all being capable of synchronous rectification.

Figure 3:
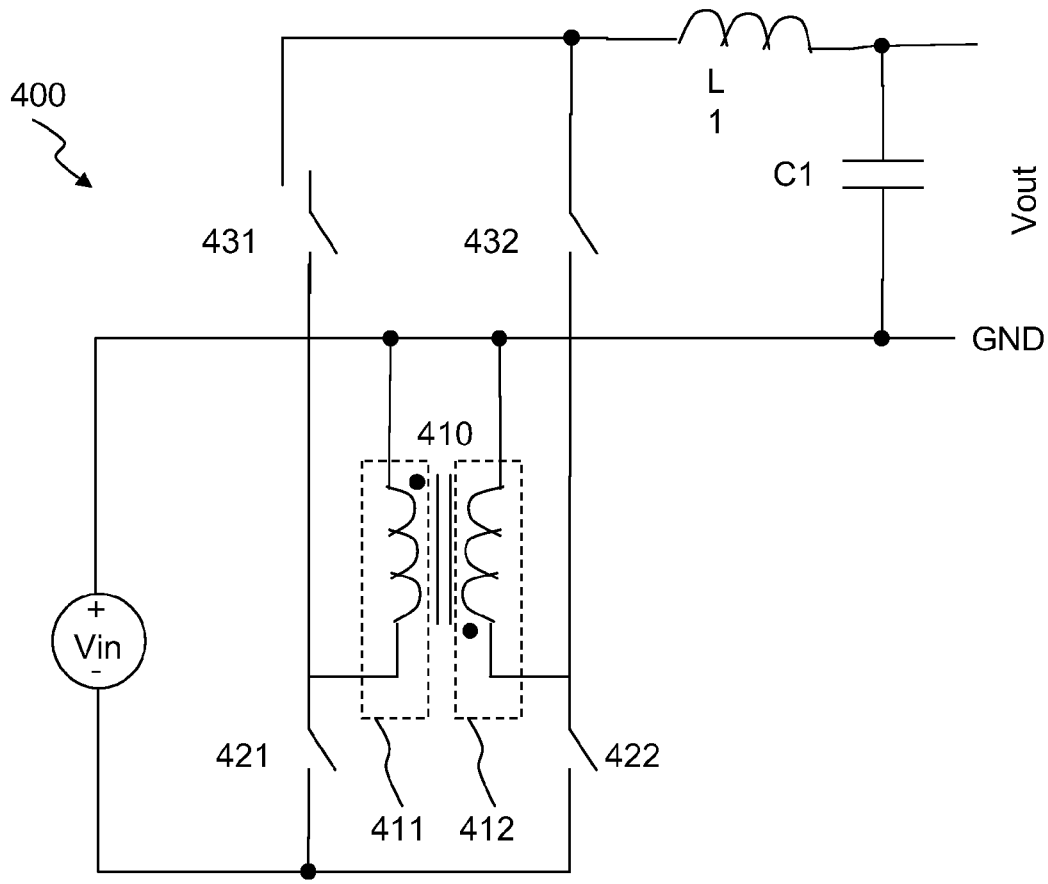
FIG. 3 shows a schematic overview of an exemplifying push-pull converter.

With reference to FIG. 3, an exemplifying push-pull converter 400 configured to convert an input voltage to an output voltage according to a transfer ratio is shown.

The push-pull converter 400 comprises a transformer 410 comprising a first set of transformer windings 411 and a second set of transformer windings 412. The first and second sets of transformer windings 411, 412 are arranged with opposite polarity with respect to each other.

The push-pull converter 400 further comprises a first switch transistor 421 arranged to operatively provide the input voltage to the first set of transformer windings 411 such that the transfer ratio is obtainable. As a non-limiting example, the first switch transistor 421 may be connected to the first set of transformer windings 411 for application of the input voltage to at least one transformer winding of the first set of transformer windings 411.

The push-pull converter 400 further comprises a second switch transistor 422 arranged to operatively provide the input voltage to the second set of transformer windings 412 such that the transfer ratio is obtainable. As a non-limiting example, the second switch transistor 422 may be connected to the second set of transformer windings 412 for application of the input voltage to at least one transformer winding of the second set of transformer windings 412.

The push-pull converter 400 further comprises a first rectification transistor 431 arranged to operatively receive a first part of the output voltage from the first set of transformer windings 411 such that the transfer ratio is obtainable. As a non-limiting example, the first rectification transistor 431 may be connected to the first set of transformer windings 411 for receiving the first part of the output voltage over at least one transformer winding of the first set of transformer windings 411.

The push-pull converter 400 further comprises a second rectification transistor 432 arranged to operatively receive a second part of the output voltage from the second set of transformer windings 412 such that the transfer ratio is obtainable. As a non-limiting example, the second rectification transistor 432 may be connected to the second set of transformer windings 412 for receiving the second part of the output voltage over at least one transformer winding of the second set of transformer windings 412, Furthermore, the push-pull converter 400 is configured to synchronously operate the first switch transistor 421 and the first rectification transistor 431, synchronously operate the second switch transistor 422 and the second rectification transistor 432, and operate the first and second switch transistors 421, 422 180 degrees out of phase with respect to each other.

Figure 2:
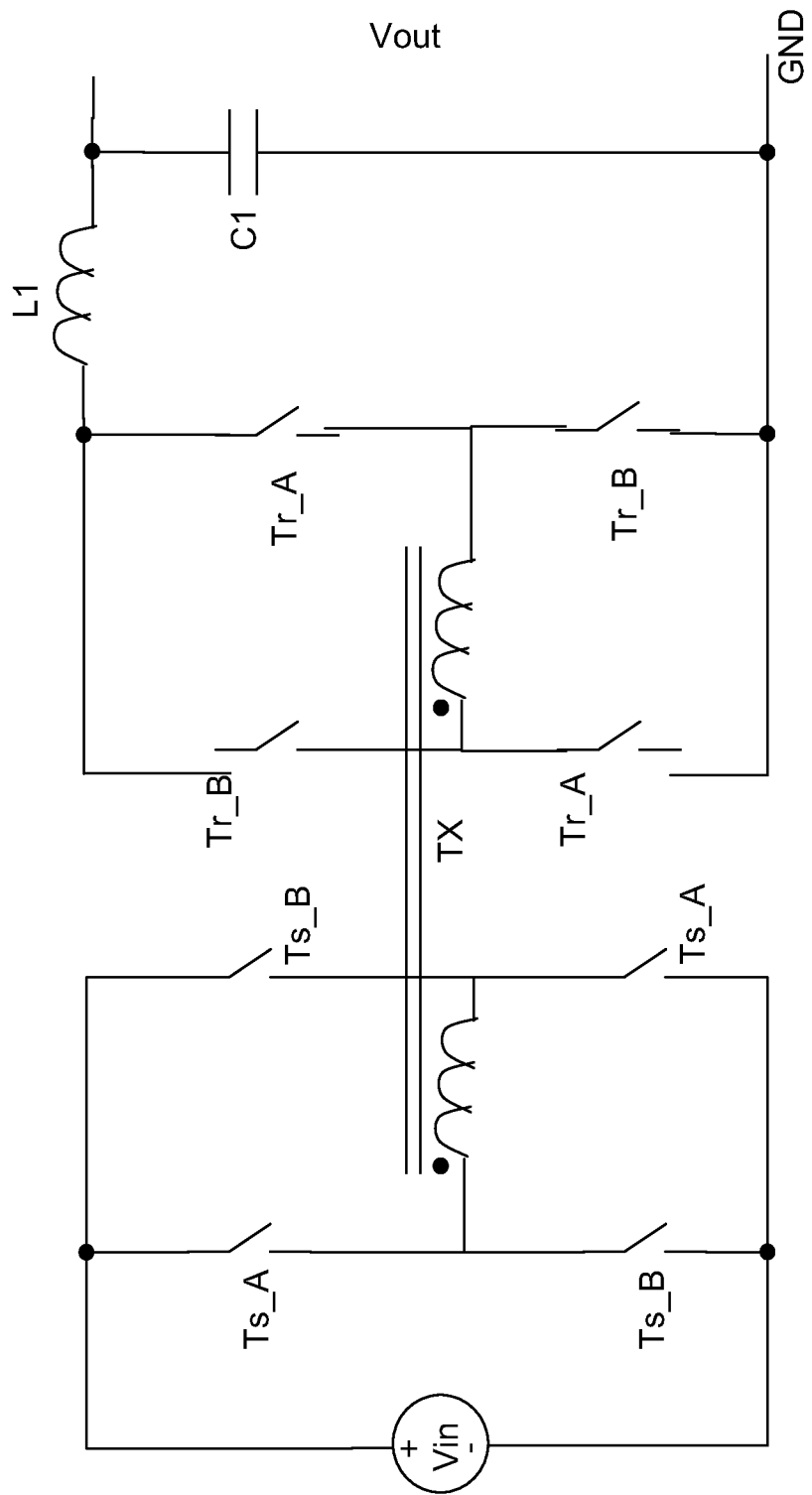
FIG. 2 shows a schematic overview of another known converter.

The push-pull converter 400 described above is advantageous in that the number of transistors is relatively small. Therefore, a board space, such as an area of a printed circuit board (PCB), will be less than for the converter illustrated in FIG. 2.

Moreover, the use of transistors reduces the power consumption of the converter, since loss in transistors is typically less than loss in diodes.

Furthermore, dead time of the transistor may be reduced thanks to synchronous operation of the operation of the first switch transistor and the first rectification transistor as well as the second switch transistor and the second rectification transistor. A reduced dead time implies reduced power dissipation in e.g. high frequency applications. Generally speaking, the dead time refers to a duration of time from switching off of a first control element until switching on of a second control element and vice versa. In this manner, shortage of systems switched on/off by the first and second control element, respectively, is avoided. According to embodiments herein, shortage of input voltage originating voltages and currents towards the output side where the output voltage is obtained may be avoided.

In some embodiments of the push-pull converter 400, the first and second switch transistors 421, 422 are arranged to operatively provide the input voltage to a first number of transformer windings of the first and second set of transformer windings 411, 412, respectively. Moreover, the first and second rectification transistors 431, 432 are arranged to operatively receive the first and second parts of the output voltage from a second number of transformer windings of the first and second set of transformer windings 411, 412, respectively. By selecting the first and second numbers of transformer windings properly, different transfer ratios are obtainable. The first number of transformer windings and the second number of transformer windings may be identical or different. This will be explained with reference to FIG. 4a-4d below.

FIG. 4a-4d illustrate four different example implementations. All implementations have in common that when either of the first and second switch transistors 421 or 422 are turned on, energy is being transferred to the output, i.e. the output voltage Vout, via the opposite transformer winding. In other words, if the first switch transistor 421 is turned on current flows through the second rectification transistor 432 to the output and if the second switch transistor 422 is turned on current flows through the first rectification transistor 431 to the output.

Thus, example embodiments are presented herein which comprise the addition of extra windings in series with the original transformer winding. In this manner, the transformer may be given an autotransformer function, whilst still being a push-pull converter. By connecting the switching and rectifying elements to different tapings on the transformer different transfer ratios can be achieved. As a result thereof, different number of windings may be activated for input voltage and output voltage.

Figure 4A:
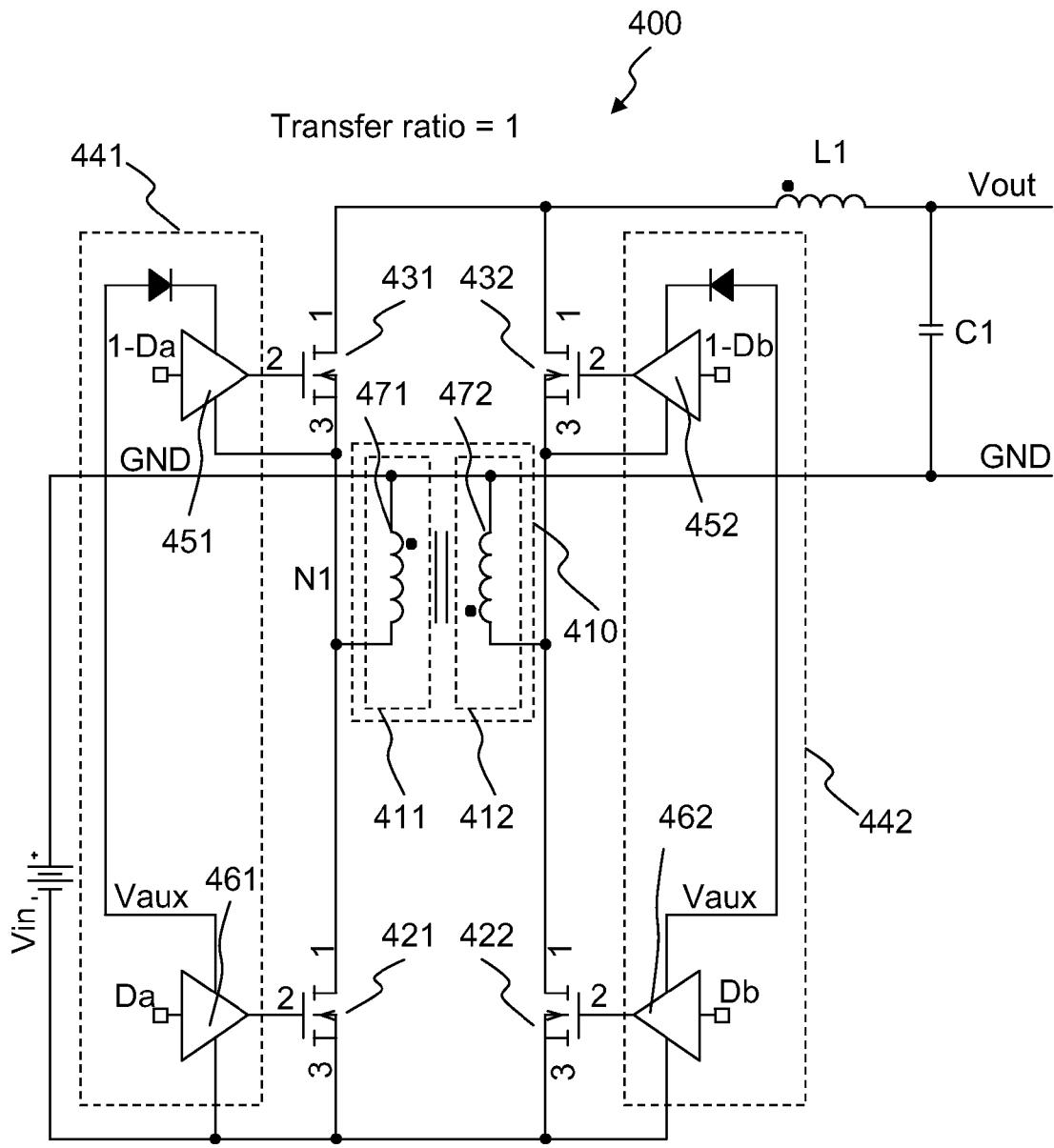
FIG. 4a shows a schematic overview of an exemplifying push-pull converter for which the transfer ratio is 1.
Figure 4B:
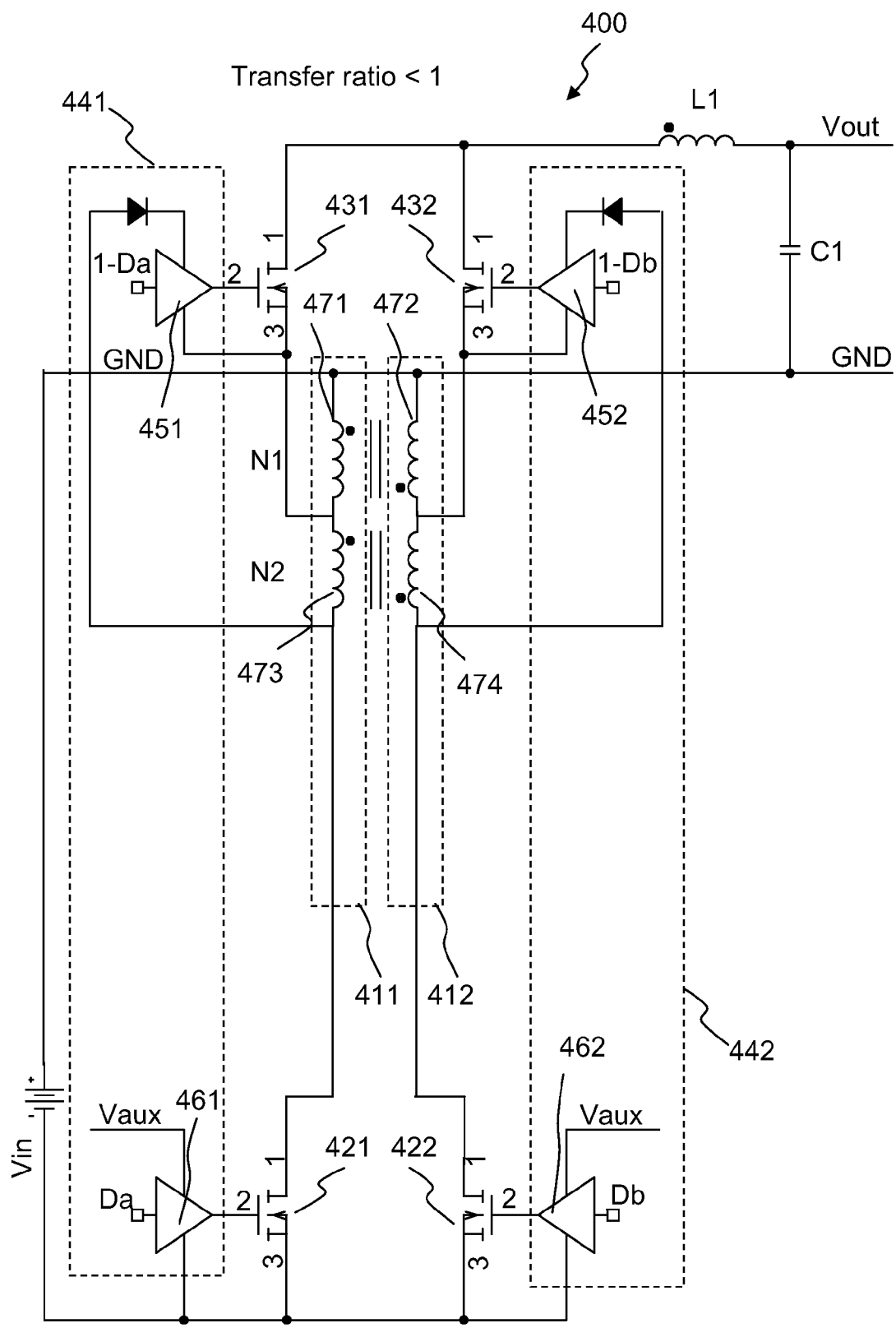
FIG. 4b shows a schematic overview of an exemplifying push-pull converter for which the transfer ratio is less than 1.
Figure 4C:
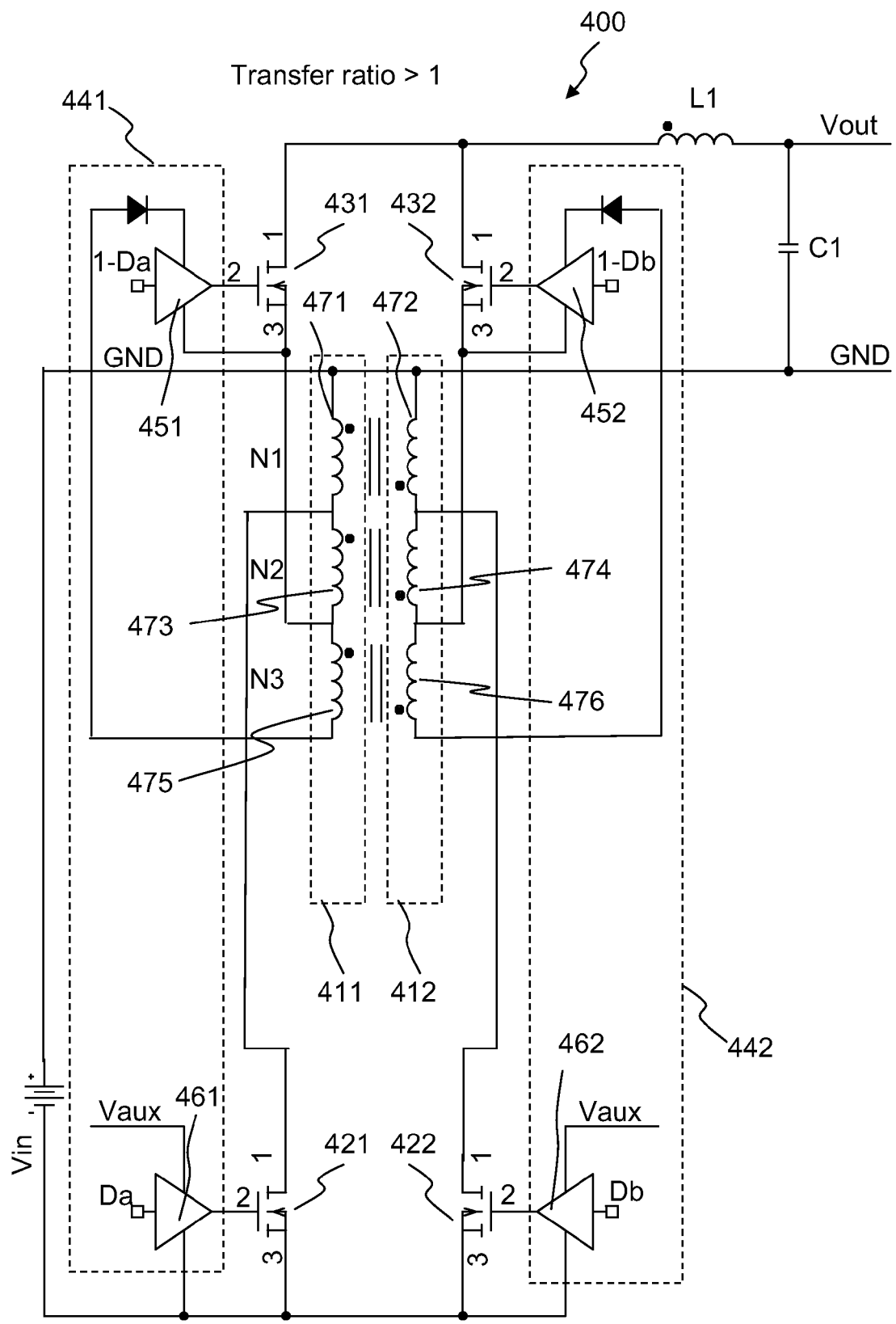
FIG. 4c shows a schematic overview of an exemplifying push-pull converter for which the transfer ratio is greater than 1.
Figure 4D:
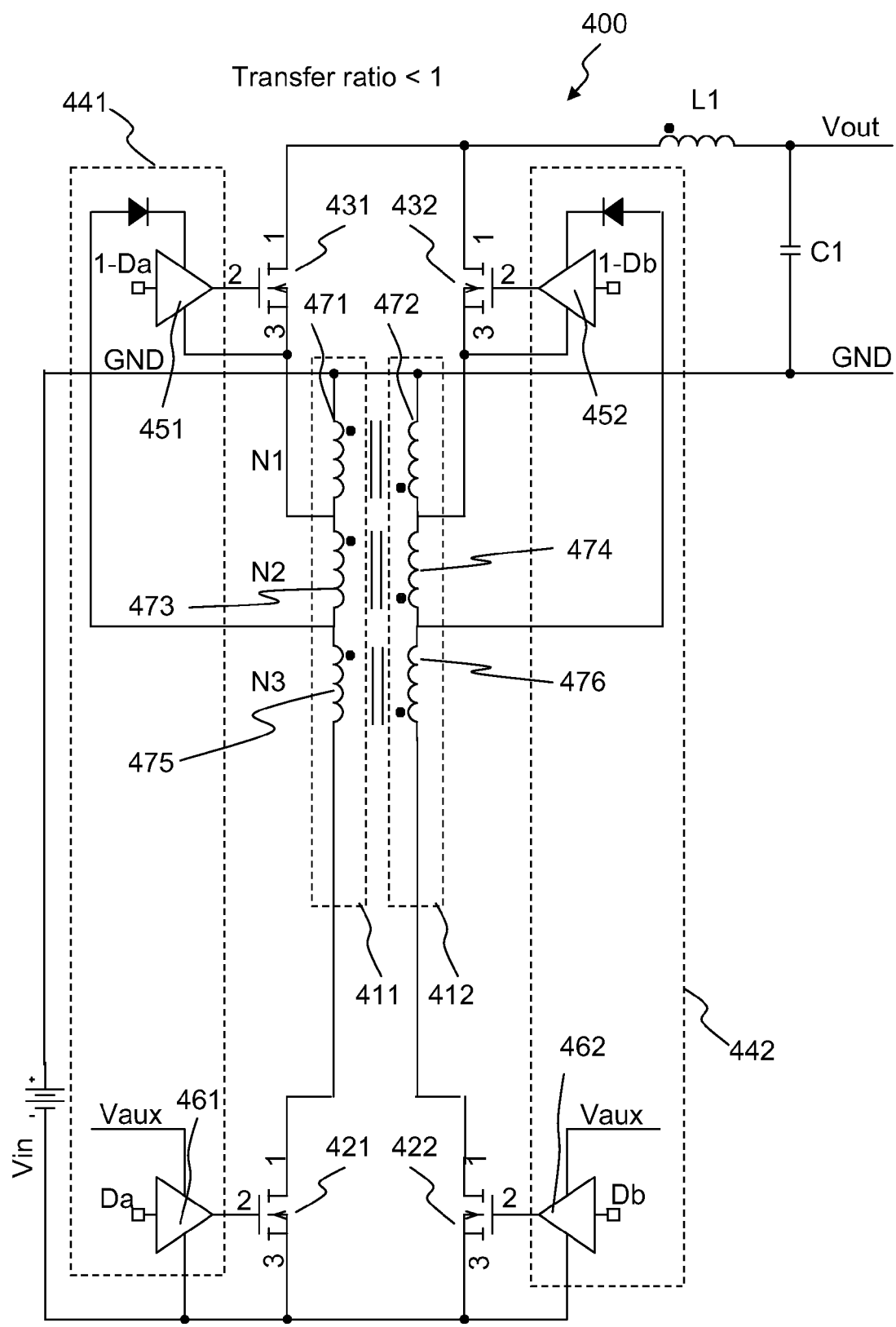
FIG. 4d shows a schematic overview of an exemplifying push-pull converter for which the transfer ratio is less than 1.

In the simplest implementation as shown in FIG. 4a, a on-to-one (1:1) ratio is obtained. Then, a standard half-bridge driver can be used to achieve synchronous rectification. In the examples of FIG. 4b-4d a floating driver may be used.

The first and second switch transistors 421, 422 may operate 180 degrees out of phase with a duty cycle Da and Db, respectively. The first and second rectification transistors 431, 432 may operate with the duty cycle of (1-Da) and (1-Db), respectively. This means that the first rectification transistor 431 is turned on when the first switch transistor 421 is turned off, with a small dead time added during the commutation period.

The push-pull converter 400 may further comprise a first driver circuit 441 configured to synchronously drive the first switch transistor 421 and the first rectification transistor 431, and a second driver circuit 442 configured to synchronously drive the second switch transistor 422 and the second rectification transistor 432. As mentioned, the first and second driver circuits 441, are configured to drive the first and second switch transistors 421, 422 at 180 degrees out of phase with respect to each other such that the input voltage is alternately applied to the first or second set of transformer windings 411, 412 for obtaining the transfer ratio.

With reference to FIG. 4a, when the transfer ratio is one (1:1), a simplified implementation is obtained. In this implementation, only two windings 471, 472 are required in the transformer. Moreover, the first driver circuit 441 is a first standard half-bridge driver, and the second driver circuit 442 is a second standard half-bridge driver. Standard half-bridge drivers are readily available at a low cost. The first standard half-bridge driver is configured to drive the first rectification transistor 431 at 1-Da and the first switch transistor 421 at Da. Da denotes a duty cycle, e.g. switched on duration for the first rectification and first switch transistor 431, 421. The second standard half-bridge driver is configured to drive the second rectification transistor at 1-Db and the second switch transistor 422 at Db. Db denotes another duty cycle, e.g. switched on duration for the second rectification and second switch transistor 432, 422. Da and Db keeps their meaning in FIG. 4b and FIG. 4c.

In this example, the first number of transformer windings is equal to the second number of transformer windings. Consequently, the input voltage is provided to the same number of transformer windings as the first and second parts of the output voltage are received from.

Typically, and as shown in FIG. 4a, there is only one transformer winding in each of the first and second set of transformer windings. Such solitary transformer windings may have a respective turn number of N1, or a respective winding number of N1. The turn number refers to a number of turns of for example such solitary transformer winding. In this manner, the push-pull converter 400 is configured for conversion of the input voltage to the output voltage according to the transfer ratio of one, as previously mentioned.

Now turning to FIG. 4b, an exemplifying push-pull converter 400 which is configured to obtain a transfer ratio of less than one is shown.

In this example, the first set of transformer windings 411 comprises a first and a third transformer winding 471, 473, and the second set of transformer windings 412 comprises a second and a fourth transformer winding 472, 474. In this manner, it is made possible that the first number of transformer windings is greater than the second number of transformer windings i.e. the input voltage may be applied to a different number of transformer windings than the number of transformer winds from which the first and second part of the output voltage is received. As a result, the push-pull converter 400 is configured for conversion of the input voltage to the output voltage according to the transfer ratio of less than one, as mentioned.

The first and second transformer windings 471, 472 may have a first common winding number N1, as in the previous example with reference to FIG. 4a. Similarly, the third and fourth transformer windings 473, 474 may have a second common winding number N2. Then, the transfer ratio is given by N1/(N1+N2).

This implementation may utilize a floating driver which bias can be taken from the winding, N2. Thus, the first driver circuit 441 may comprise a first floating driver 451 arranged to operatively drive the first rectification transistor 431, and a first driver unit 461 arranged to operatively drive the first switch transistor 421. Similarly, the second driver circuit 442 may comprises a second floating driver 452 arranged to operatively drive the second rectification transistor 432, and a second driver unit 462 arranged to operatively drive the second switch transistor 422.

In this example, the first floating driver 451 is biased at the third transformer winding 473, the first driver unit 461 is biased at the first switch transistor 421, the second floating driver is biased at the fourth transformer winding 474, and the second driver unit 462 is biased at the second switch transistor 422.

According to a further exemplifying push-pull converter 400, as shown in FIG. 4c, the first set of transformer windings 411 comprises a fifth transformer winding 475, and the second set of transformer windings 412 comprises a sixth transformer winding 476. Due to the configuration of the push-pull converter 400, illustrated in FIG. 4c, a transfer ratio greater than may be accomplished. The transfer ratio is given by (N1+N2)/N1. This implementation may also utilize a floating driver. In this example, bias of the floating driver can be taken from a separate bias winding, N3. In other examples, the floating driver may generate its own bias or a conductor that drives the driver will be charged when the converter freewheels and the voltage over the transformer is zero.

In this example, the first number of transformer windings is less than the second number of transformer windings, whereby the push-pull converter 400 is configured for conversion of the input voltage to the output voltage according to the transfer ratio of greater than one.

Moreover, the first floating driver 451 may be biased at the fifth transformer winding 475. The first driver unit 461 may be biased at the first switch transistor 421, the second floating driver 452 may be biased at the sixth transformer winding 476, and the second driver unit 462 may be biased at the second switch transistor 422.

In FIG. 4d, an implementation of the push-pull converter 400 is shown. This example illustrates an alternative implementation according to which the transfer ratio is less than one.

Similarly to FIG. 4c, the first set of transformer windings 411 comprises a fifth transformer winding 475, and the second set of transformer windings 412 comprises a sixth transformer winding 476, but with respect to bias of the driving circuits this example is similar to the embodiment shown in FIG. 4b. Hence, as mentioned above, the first floating driver 451 is biased at the third transformer winding 473, the first driver unit 461 is biased at the first switch transistor 421, the second floating driver 452 is biased at the fourth transformer winding 474, and the second driver unit 462 is biased at the second switch transistor 422.

In this example, the transfer ratio can be given by N1/(N1+N2+N3).

For simplicity, the examples above have been discussed with respect to the transfer ratio which relates to the transformer 410 and similar. When the input voltage is converted to an output voltage according to the transfer ratio, it is understood that a more detailed relationship for the input to output voltage is given by: Vout=(Da+Db)*Nout/Nin*Vin, wherein Nout is the number of transformer windings over which the first and second part of the output voltage is received and Nin the number of transformer windings at which the input voltage is applied. Da may be the same as or different from Db.

The described configurations all offer synchronous rectification, enabling a high efficiency, whilst still only using half the amount of rectification elements and drivers compared to a standard full-bridge on both primary and secondary approach, which reduces board space and cost.

When designing this type of converter one tries to minimize the dead time between the synch transistors and the switch transistors. This time can be reduced in this solution since all solutions can use a driver which drives both transistors in the same branch, the mismatch between two drivers in the same package and two separate drivers can be in the range of 20 ns, which results in higher power dissipation in high frequency applications.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

SUMMARY OF EXAMPLE EMBODIMENTS

Figure 1:
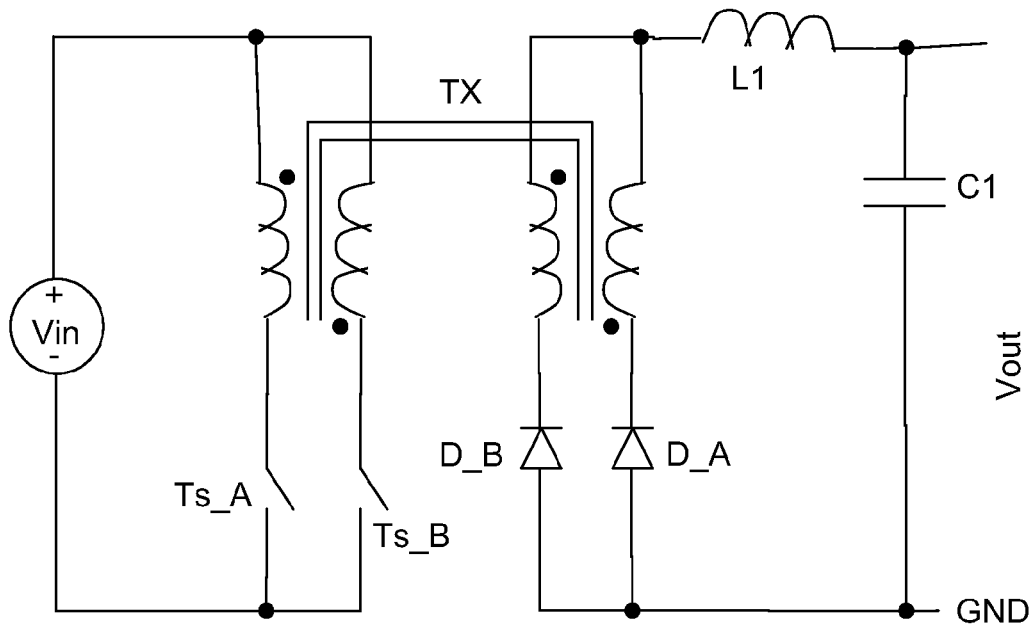
FIG. 1 shows a schematic overview of a known converter.

1. Example embodiments presented herein provide a converter comprising a plurality of switch transistors operating 180 degrees out of phase.
2. Some of the example embodiments may further comprise the converter having a transfer ratio of 1, wherein the converter comprises two windings and a standard half-bridge driver. In some example embodiments the converter may have a configuration as illustrated in the left-most configuration of FIG. 1.
3. Some of the example embodiments may further comprise the converter having a transfer ratio that is greater than 1, wherein the converter comprises an input to output voltage transfer ratio of (N1+N2)/N1. In some example embodiments the converter may have a configuration as illustrated in the middle configuration of FIG. 1.
4. Some example embodiments may further comprise the converter having a transfer ratio that is less than 1, wherein the converter comprises an input to output voltage transfer ratio as of N1/(N1+N2+N3). In some example embodiments the converter may have a configuration as illustrated in the right-most configuration of FIG. 1.

More particular, one example embodiment provides a push-pull converter configured to convert an input voltage to an output voltage according to a transfer ratio. The push-pull converter comprises: a transformer comprising a first set of transformer windings and a second set of transformer windings, wherein the first and second sets of transformer windings are arranged with opposite polarity with respect to each other; a first switch transistor arranged to operatively provide the input voltage to the first set of transformer windings such that the transfer ratio is obtainable; a second switch transistor arranged to operatively provide the input voltage to the second set of transformer windings such that the transfer ratio is obtainable; a first rectification transistor arranged to operatively receive a first part of the output voltage from the first set of transformer windings such that the transfer ratio is obtainable; a second rectification transistor arranged to operatively receive a second part of the output voltage from the second set of transformer windings such that the transfer ratio is obtainable. The push-pull converter is configured to: synchronously operate the first switch transistor and the first rectification transistor; synchronously operate the second switch transistor and the second rectification transistor; and operate the first and second switch transistors at 180 degrees out of phase with respect to each other.

The first and second switch transistors may be arranged to operatively provide the input voltage to a first number of transformer windings of the first and second set of transformer windings, respectively. The first and second rectification transistors may be arranged to operatively receive the first and second parts of the output voltage from a second number of transformer windings of the first and second set of transformer windings, respectively.

The first number of transformer windings may be equal to the second number of transformer windings, whereby the push-pull converter is configured for conversion of the input voltage to the output voltage at the transfer ratio of one.

The first number of transformer windings may be greater than the second number of transformer windings, whereby the push-pull converter is configured for conversion of the input voltage to the output voltage at the transfer ratio of less than one.

The first number of transformer windings may be less than the second number of transformer windings, whereby the push-pull converter is configured for conversion of the input voltage to the output voltage at the transfer ratio of greater than one.

The first set of transformer windings may comprise a first and a third transformer winding, and the second set of transformer windings may comprise a second and a fourth transformer winding.

The first set of transformer windings may comprise a fifth transformer winding, and the second set of transformer windings may comprises a sixth transformer winding.

The push-pull converter may further comprise: a first driver circuit configured to synchronously drive the first switch transistor and the first rectification transistor; and a second driver circuit configured to synchronously drive the second switch transistor and the second rectification transistor. Here, the first and second driver circuits may be configured to drive the first and second switch transistors at 180 degrees out of phase with respect to each other such that the input voltage is alternately applied to the first or second set of transformer windings for obtaining the transfer ratio.

The first driver circuit may be a first standard half-bridge driver, and the second driver circuit may be a second standard half-bridge.

The first driver circuit may comprise: a first floating driver arranged to operatively drive the first rectification transistor, and a first driver unit arranged to operatively drive the first switch transistor. Here, the second driver circuit may comprise: a second floating driver arranged to operatively drive the second rectification transistor, and a second driver unit arranged to operatively drive the second switch transistor.

The first floating driver may be biased at the third transformer winding, the first driver unit may be biased at the first switch transistor, the second floating driver may be biased at the fourth transformer winding, and the second driver unit may be biased at the second switch transistor.

The first floating driver may be biased at the fifth transformer winding, the first driver unit may be biased at the first switch transistor, the second floating driver may be biased at the sixth transformer winding, and the second driver unit may be biased at the second switch transistor.

The present invention has now been described with reference to exemplifying embodiments. However, the invention is not limited to the embodiments described herein. On the contrary, the full extent of the invention is only determined by the scope of the appended claims.

The invention claimed is:

1. A push-pull converter configured to convert an input voltage to an output voltage according to a transfer ratio, wherein the push-pull converter comprises:
   a transformer comprising a first set of transformer windings and a second set of transformer windings, wherein the first and second sets of transformer windings are arranged with opposite polarity with respect to each other;
   a first switch transistor arranged to operatively provide the input voltage to the first set of transformer windings such that the transfer ratio is obtainable;
   a second switch transistor arranged to operatively provide the input voltage to the second set of transformer windings such that the transfer ratio is obtainable;
   a first rectification transistor arranged to operatively receive a first part of the output voltage from the first set of transformer windings such that the transfer ratio is obtainable;
   a second rectification transistor arranged to operatively receive a second part of the output voltage from the second set of transformer windings such that the transfer ratio is obtainable;
   wherein the push-pull converter is configured to:
   synchronously operate the first switch transistor and the first rectification transistor;
   synchronously operate the second switch transistor and the second rectification transistor; and
   operate the first and second switch transistors 180 degrees out of phase with respect to each other,
   wherein the set of transformer windings is connected in series between the first switch transistor and the first rectification transistor, and the second set of transformer windings is connected in series between the second switch transistor and the second rectification transistor.

2. The push-pull converter according to claim 1, wherein the first and second switch transistors are arranged to operatively provide the input voltage to a first number of transformer windings of the first and second set of transformer windings, respectively, and wherein the first and second rectification transistors are arranged to operatively receive the first and second parts of the output voltage from a second number of transformer windings of the first and second set of transformer windings, respectively.

3. The push-pull converter according to claim 2, wherein the first number of transformer windings is equal to the second number of transformer windings, whereby the push-pull converter is configured for conversion of the input voltage to the output voltage at the transfer ratio of one.

4. The push-pull converter according to claim 2, wherein the first number of transformer windings is greater than the second number of transformer windings, whereby the push-pull converter is configured for conversion of the input voltage to the output voltage at the transfer ratio of less than one.

5. The push-pull converter according to claim 2, wherein the first number of transformer windings is less than the second number of transformer windings, whereby the push-pull converter is configured for conversion of the input voltage to the output voltage at the transfer ratio of greater than one.

6. The push-pull converter of claim 2, wherein the first and second number of transformer windings of the first set of transformer windings is connected in series between the first switch transistor and the first rectification transistor, and the first and second number of transformer windings of the second set of transformer windings is connected in series between the second switch transistor and the second rectification transistor.

7. The push-pull converter according to claim 1, wherein the first set of transformer windings comprises a first and a third transformer winding, and wherein the second set of transformer windings comprises a second and a fourth transformer winding.

8. The push-pull converter according to claim 7, wherein the first set of transformer windings comprises a fifth transformer winding, and wherein the second set of transformer windings comprises a sixth transformer winding.

9. The push-pull converter of claim 8, wherein the first, third, and fifth transformer windings of the first set of transformer windings are connected in series between the first switch transistor and the first rectification transistor, and the second, fourth, and sixth transformer windings of the second set of transformer windings are connected in series between the second switch transistor and the second rectification transistor.

10. The push-pull converter according to claim 1, further comprising:
    a first driver circuit configured to synchronously drive the first switch transistor and the first rectification transistor; and
    a second driver circuit configured to synchronously drive the second switch transistor and the second rectification transistor,
    wherein the first and second driver circuits are configured to drive the first and second switch transistors 180 degrees out of phase with respect to each other such that the input voltage is alternately applied to the first or second set of transformer windings for obtaining the transfer ratio.

11. The push-pull converter according to claim 10, wherein the first driver circuit is a first standard half-bridge driver, and wherein the second driver circuit is a second standard half-bridge driver.

12. The push-pull converter according to claim 10, wherein the first driver circuit comprises:
   a first floating driver arranged to operatively drive the first rectification transistor, and
   a first driver unit arranged to operatively drive the first switch transistor; and
   the second driver circuit comprises:
   a second floating driver arranged to operatively drive the second rectification transistor, and
   a second driver unit arranged to operatively drive the second switch transistor.

13. The push-pull converter according to claim 12, wherein the first set of transformer windings comprises a first and a third transformer winding,
   the second set of transformer windings comprises second and a fourth transformer winding,
   the first floating driver is biased at the third transformer winding,
   the first driver unit is biased at the first switch transistor,
   the second floating driver is biased at the fourth transformer winding, and
   the second driver unit is biased at the second switch transistor.

14. The push-pull converter according to claim 12, wherein the first set of transformer windings comprises a first, a third, and a fifth transformer winding,
   the second set of transformer windings comprises a second, further, and sixth transformer winding
   the first floating driver is biased at the fifth transformer winding,
   the first driver unit is biased at the first switch transistor,
   the second floating driver is biased at the sixth transformer winding, and
   the second driver unit is biased at the second switch transistor.

15. The push-pull converter according to claim 1, wherein the first switch transistor and the first rectification transistor are turned on and turned off at the same time, and the second switch transistor and the second rectification transistor are turned on and turned off at the same time.

* * * * *

UNITED STATES PATENT AND TRADEMARK OFFICE
CERTIFICATE OF CORRECTION

PATENT NO.        : 9,088,212 B2
APPLICATION NO.   : 13/340013
DATED             : July 21, 2015
INVENTOR(S)       : Appelberg Page 1 of 1

It is certified that error appears in the above-identified patent and that said Letters Patent is hereby corrected as shown below:

Specification

In Column 3, Line 45, delete "windings 412," and insert -- windings 412. --, therefor.

In Column 4, Line 42, delete "on-to-one" and insert -- one-to-one --, therefor.

In Column 4, Lines 58-59, delete "the first and second driver circuits 441," and insert -- the first and second driver circuits 441, 442 --, therefor.

In Column 5, Line 9, delete "transistor at 1-Db" and insert -- transistor 432 at 1-Db --, therefor.

In Column 5, Line 63, delete "driver" and insert -- driver 452 --, therefor.

In Column 6, Line 5, delete "than may" and insert -- than 1 may --, therefor.

Claims

In Column 9, Line 65, in Claim 1, delete "the set" and insert -- the first set --, therefor.

In Column 11, Line 21, in Claim 13, delete "second" and insert -- a second --, therefor.

Signed and Sealed this
Sixteenth Day of August, 2016

Michelle K. Lee
*Director of the United States Patent and Trademark Office*